United States Patent [19]
Plymoth

[11] 4,185,801
[45] Jan. 29, 1980

[54] SUSPENSION ARMS

[75] Inventor: Jan L. A. Plymoth, Lycksele, Sweden

[73] Assignee: Plymoth PP AB, Lycksele, Sweden

[21] Appl. No.: 909,687

[22] Filed: May 25, 1978

[30] Foreign Application Priority Data

Jun. 1, 1977 [SE] Sweden ................................ 7706374

[51] Int. Cl.² ............................................. A47G 29/00
[52] U.S. Cl. ................................. 248/289 R; 248/122
[58] Field of Search ........... 248/278, 279, 280, 289 R, 248/289 A, 283, 282, 123, 122, 124, 324, 325

[56] References Cited

U.S. PATENT DOCUMENTS

| 393,247 | 11/1888 | Lambert | 248/282 X |
| 613,231 | 11/1898 | Bennett | 248/282 X |
| 843,298 | 2/1907 | Pyle | 248/278 |
| 1,931,093 | 10/1933 | Sinko | 248/289 |
| 2,454,613 | 11/1948 | Peltier et al. | 248/278 X |
| 3,219,303 | 11/1965 | Stryker | 248/280 |
| 3,239,184 | 3/1966 | Kirkeby | 248/280 |

*Primary Examiner*—J. Franklin Foss
*Attorney, Agent, or Firm*—Bucknam and Archer

[57] ABSTRACT

The disclosure relates to a suspension arm for the suspension of tools, pieces of equipment etc. For the purposes of adjusting the tools etc. in the desired operational position, the arm is horizontally pivotally connected to a support. A brake with adjustable braking force is provided for retaining the arm in the desired, adjusted pivotal position.

2 Claims, 3 Drawing Figures

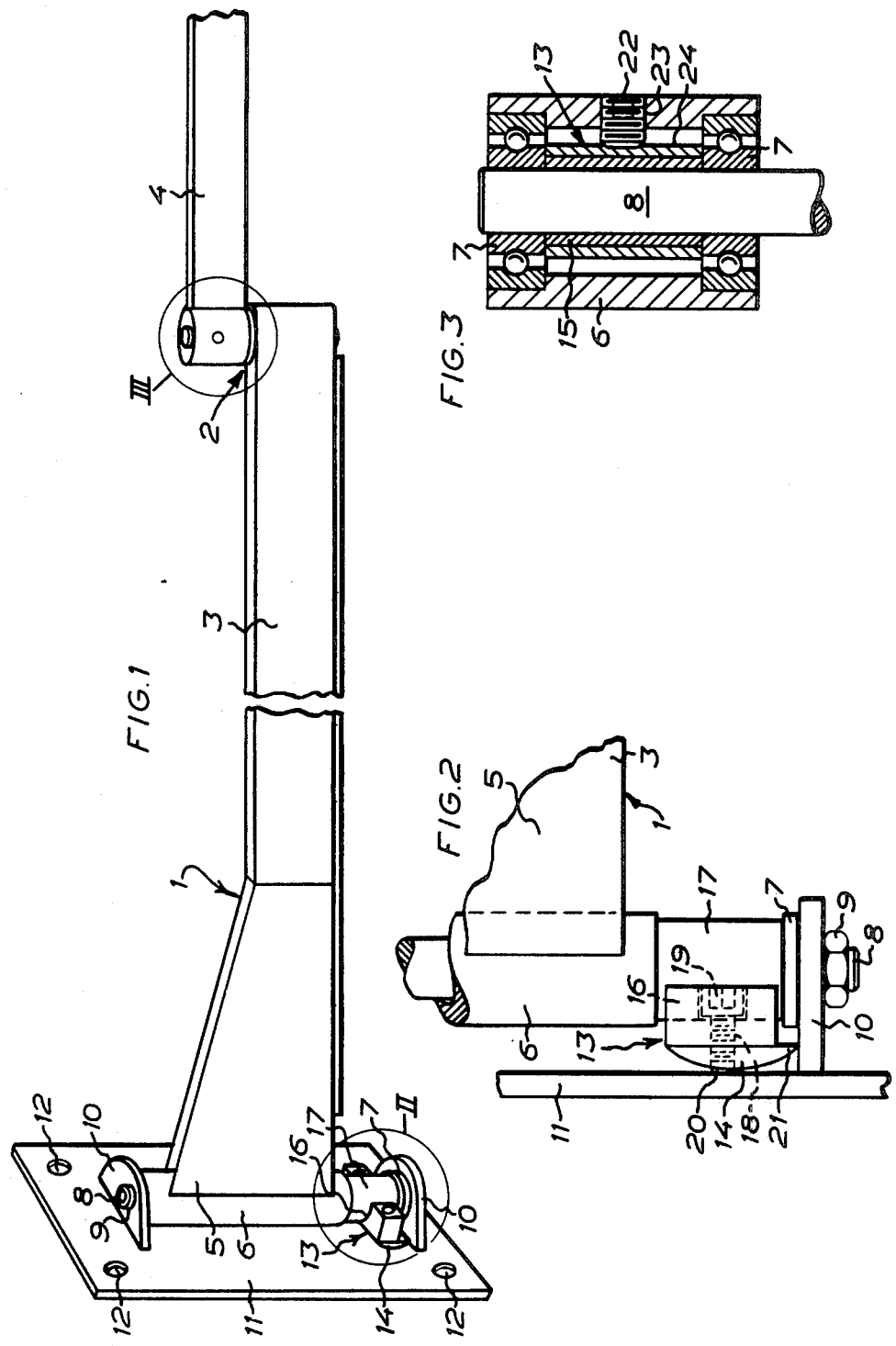

SUSPENSION ARMS

The present invention relates to an improvement in an arm for the suspension of tools, pieces of equipment and the like, the arm being, at its one end, horizontally pivotally connected, by means of a mounting, to a support, preferably in the form of a wall or the like.

Problems occur in the prior art suspension arms of this type in that they do not remain in place in the adjusted pivotal position but show a tendency to swing in one or the other direction. This phenomenon becomes more monifest the more the arm is loaded with tools, equipment and the like and the more the pivotal connection to the support is worn out.

This problem is solved according to the invention in that there is provided a brake device which acts between the above-mentioned one end of the arm and the anchorage in order to retain the arm in the adjusted pivotal position.

The nature of the present invention and its aspects will be more readily understood from the following brief description of the accompanying drawings, and discussion relating thereto.

In the accompanying drawings:

FIG. 1 is a schematic and perspective view of a suspension arm (shortened in length), a wall mounting and a brake device, the brake device being shown on a larger scale in FIG. 2 corresponding to the region within the circle II in FIG. 1 and a brake device between two parts included in the arm being shown in longitudinal section and on a larger scale in FIG. 3, corresponding to the region within the circle III in FIG. 1, it being possible as an alternative to interchange the latter brake device with the former; in other words two alternative embodiments of the brake device between the arm and the mounting are shown.

The arm 1 shown on the drawing is intended for the suspension of a tool, piece of equipment or the like (not shown) for example a local-range smoke extracting assembly and has, in the illustrated embodiment, two parts 3 and 4 pivotally interconnected by means of a link 2. The arm 1 is provided, at its one end 5, with a vertically directed bearing tube 6 fixedly welded thereon. This tube surrounds and is, by means of suitable bearings 7, pivotally journalled on a vertically directed spindle 8 which is fixedly mounted, by means of nuts 9 or the like, between two vertically spaced, horizontally directed shanks 10 on a mounting 11 in the form of a plate which may be mounted, by means of mounting devices (not shown) passed through holes 12, on a support (not shown) preferably a vertical wall or the like.

In order to retain the arm 1 in an optional, adjusted pivotal position, the present invention calls for the provision of a brake device generally designated 13 which acts radially between the arm 1 and the mounting 11, the brake device 13 having a brake member 14 or 15, respectively, movable relative to the bearing tube 6 (the embodiment according to FIG. 2) or the spindle 8 (the alternative embodiment according to FIG. 3) and arranged to be adjustably pressed against the bearing tube and the spindle, respectively.

In the primary embodiment (shown in detail in FIG. 2) of the brake device 13, the brake member is in the form of a shoe 14 with an arcuate recess 16 which has substantially the same curvature as the bearing tube 6, more precisely as a slightly and smoothly turned down portion 17 of this tube, and which partly surrounds the tube/part 6, 17. In the illustrated embodiment, the shoe 14 has two sets screws 19 which may be screwed into the shoe through threaded holes 18, one screw on either side of the recess 16, of which only one is visible. The set screws 19 are substantially horizontally directed and may be moved with their free end, by screwing in the hole 18 in the shoe 14, into adjustable abutment against a stop 20 on the mounting 11 for adjusting the compression force of the recess 16 against the bearing tube 6. In this instance, the stop 20 is constituted by the side of the mounting 11 facing the arm 1, but may also be constituted by a boss or the like disposed on the lower shank 10, an arrangement which may be suitable if the arm is located further out from the mounting than the position shown on the drawing. The shoe 14 may also be supported against the upper face of the lower shank 10 by the intermediary of a nose 21; this for more reliable horizontal guiding of the shoe 14.

The alternative embodiment of the brake device 13, shown in FIG. 3, is here illustrated as a brake device between the parts 3 and 4 of the arm. However, as was previously pointed out, this brake device may conceivably have been interchanged with the above-described brake device. Thus, in the alternative embodiment, there are provided the bearing tube 6, the bearings 7 and the spindle 8. The brake member in the alternative brake device 13 is in the form of a circular-cylindrical sleeve 15 which with close fit surrounds the spindle 8 and, in its turn, is surrounded with clearance by the bearing tube 6. A horizontally directed set screw 22 may be screwed through a threaded hole 23 in the bearing tube 6 and may be moved, with its free end, by screwing in the hole 23, into adjustable abutment against the outer sleeve surface 24 of the sleeve 15 for adjustment of the compression force of the sleeve against the spindle 8.

Suitably, the shoe 14 and the sleeve 15, respectively, are made of fibre-reinforced bakelite which has friction properties suitable for the contemplated purpose. It not all of the shoe or sleeve, respectively, is made of this material, at least those portions thereof which abut against the bearing tube 6 and the spindle 8, respectively, that is to say the defining surface of the recess 16 and the inner surface of the sleeve 15, respectively, are made of this material.

Thus, by screwing in or out of the set screws 19 and 22, respectively, it is possible to adjust the compression force of the recess 16 and the sleeve 15, respectively, against the bearing tube 6 and the spindle 8, respectively, as desired, primarily in dependence upon the loading on the arm, that is to say the mass of the suspended tool, piece of equipment and the like, so as to realise, under all loadings, a suspension arm which is moderately easily manoeuvrable by hand and retained by brake force in all pivotal positions.

In a further alternative embodiment (not shown) of the brake device 13, this may be provided with two shoes which substantially surround the bearing tube 6 and may be moved into braking friction engagement therewith. In this case, the one shoe is suitably fixedly mounted to the mounting 11 or some other part fixedly mounted thereon, and the second shoe is suitably adjustably mounted on the first shoe for adjustment of the pressing/brake force. Each shoe can, in this case, be constructed in principle in the same manner as the shoe 14 in the embodiment according to FIG. 2.

What I claim and desire to secure by Letters Patent is:

1. In a structure for supporting an object, the improvement which comprises in combination a base means: a spindle supported by said base means to define a predetermined pivot axis; an arm extending radially outward with respect to said axis; pivot connection means establishing a connection of one end of said arm to said spindle for pivotal movement relative thereto; and brake means operable to establish at said pivot connection means an adjustable braking force restricting the pivotal movement of said arm to secure same in a given position about said axis relative to the base means, said brake means including a first brake member; a second brake member, and a separate adjusting screw in direct contact with said second brake member to adjustably urge same into frictional engagement with said first brake member to establish said braking force, said first brake member being pivotable with said arm and said second brake member being movable along an adjustment path generally fixed with respect to said axis, said pivot connection means including a tube connected to said one end of said arm and receiving said spindle, and said adjusting screw being received through said tube and being pivotally movable with said tube and arm.

2. The improvement according to claim 1 wherein one of said first and second brake members includes a liner of friction producing material.

* * * * *